United States Patent [19]

Stahl et al.

[11] Patent Number: 5,413,265

[45] Date of Patent: May 9, 1995

[54] ARRANGEMENT FOR TRANSPORTING WEB-SHAPED MATERIALS TO BE SCANNED OR EXPOSED

[75] Inventors: Werner Stahl, Heimstetten; Volkmar Voigtlaender, Eichenau, both of Germany

[73] Assignee: AGFA-Gevaert A.G., Leverkusen, Germany

[21] Appl. No.: 7,607

[22] Filed: Jan. 22, 1993

Related U.S. Application Data

[63] Continuation-in-part of Ser. No. 719,822, Jun. 24, 1991, abandoned.

[30] Foreign Application Priority Data

Jul. 7, 1990 [DE] Germany .............. 40 21 660.8

[51] Int. Cl.[6] .............. B65H 20/00; F16H 1/12
[52] U.S. Cl. ................. 226/188; 74/421 A; 476/66; 476/73
[58] Field of Search ........... 226/188; 74/421 A; 476/65, 66, 70, 73; 464/51, 92, 98, 99

[56] References Cited

U.S. PATENT DOCUMENTS

| | | | |
|---|---|---|---|
| 1,870,421 | 8/1932 | Prout | 476/66 X |
| 2,221,661 | 11/1940 | Woolf | 476/66 X |
| 2,653,459 | 9/1953 | Morrill | 464/92 |
| 2,716,349 | 8/1955 | Nisenson | 74/209 |
| 3,354,670 | 11/1967 | Fawick | 464/61 |
| 3,476,173 | 11/1969 | Bracken, Jr. et al. | 464/98 X |
| 3,567,096 | 3/1971 | McDermott | 226/188 |
| 3,902,334 | 9/1975 | Ryan | 464/57 X |
| 3,908,401 | 9/1975 | Harbage | 464/92 X |
| 4,182,138 | 1/1980 | McGuire | 464/92 |
| 4,244,240 | 1/1981 | Rabenhorst | 464/92 X |
| 4,403,719 | 9/1983 | Yamashita | 226/188 |
| 4,420,109 | 12/1983 | Zahn et al. | 226/188 X |
| 4,563,166 | 1/1986 | Walter et al. | 464/92 X |
| 4,572,418 | 2/1986 | Hirata | 226/188 X |
| 4,591,882 | 5/1986 | Takeuchi | 226/188 X |
| 4,701,816 | 10/1987 | Ida | 74/209 X |
| 4,854,184 | 8/1989 | Jessup | 464/92 X |
| 4,934,990 | 6/1990 | Backers | 464/57 X |
| 5,038,629 | 8/1991 | Takimoto | 74/421 A |
| 5,223,679 | 6/1993 | Yoo | 464/92 X |

*Primary Examiner*—Daniel P. Stodola
*Assistant Examiner*—Michael R. Mansen
*Attorney, Agent, or Firm*—Michael J. Striker

[57] ABSTRACT

An arrangement for driving at least one roller of a roller unit for transporting web-shaped materials, such as X-ray sheet films or stimulatable phosphorous foils with substantially constant speed in a device for exposing or scanning these materials, the arrangement comprising a stepping motor having a motor output shaft, a friction drive having a drive input shaft, and a vibration damping mechanism provided between said motor output shaft and the drive input shaft. The drive is formed so that a ratio of the drive and a diameter of the roller is selected so that at least 20 steps of the stepping motor corresponds to a transporting path of the web-shaped material of one millimeter.

11 Claims, 4 Drawing Sheets

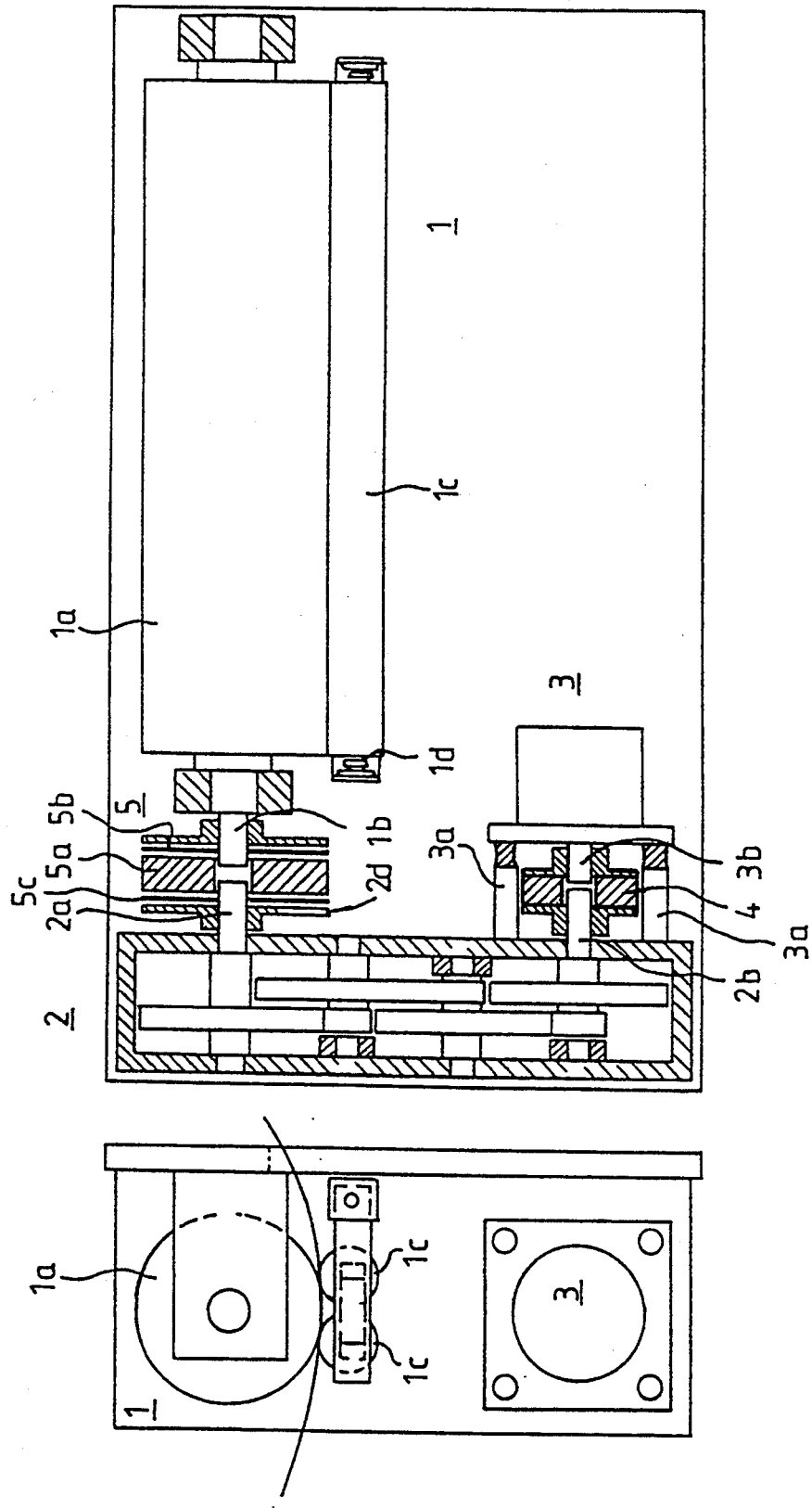

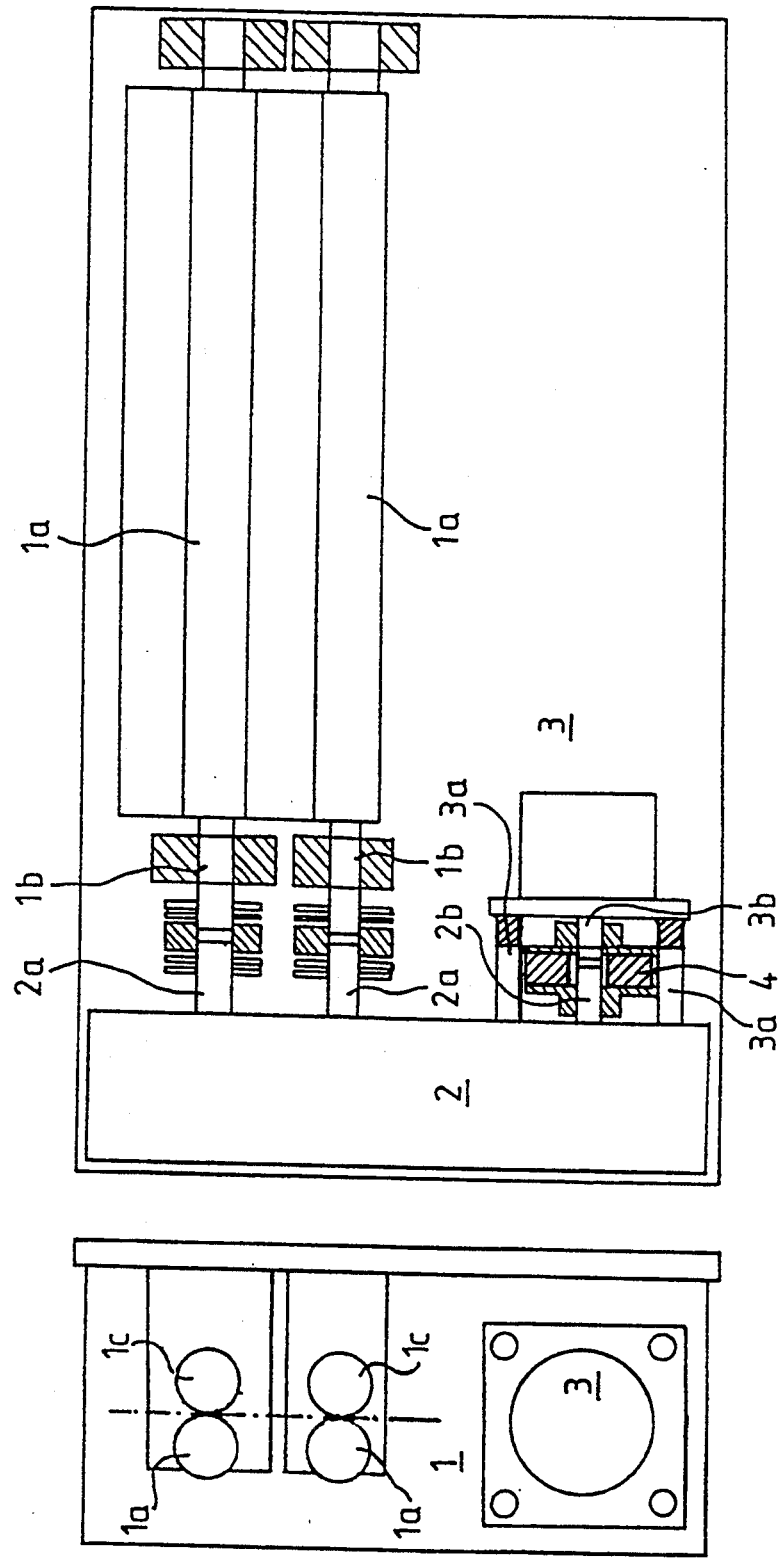

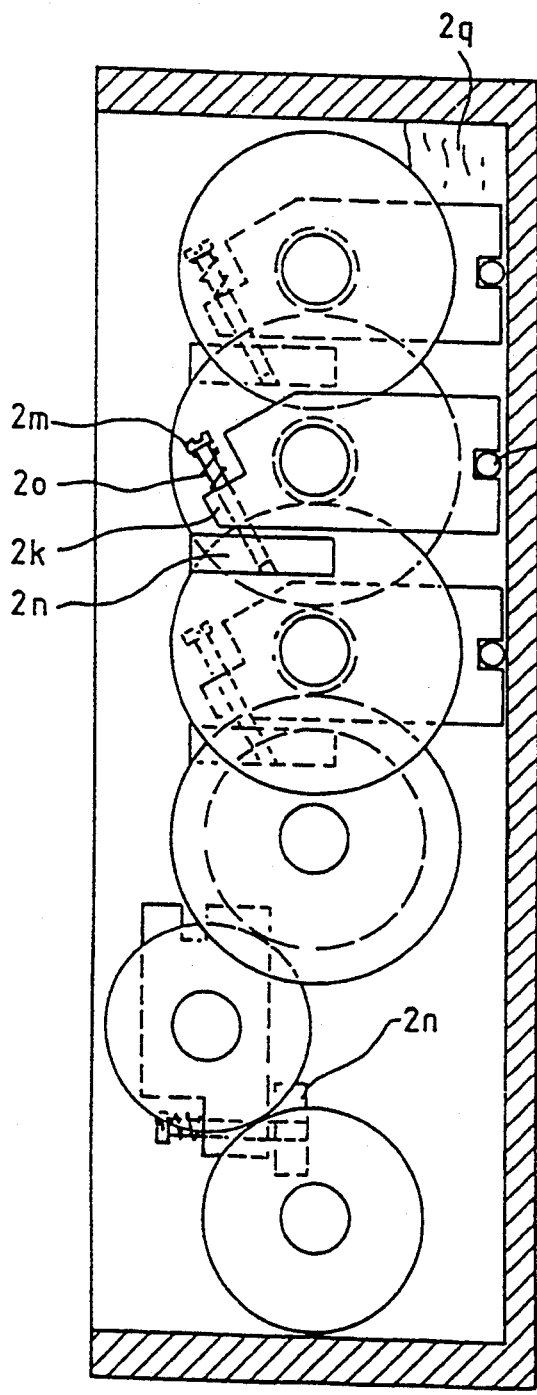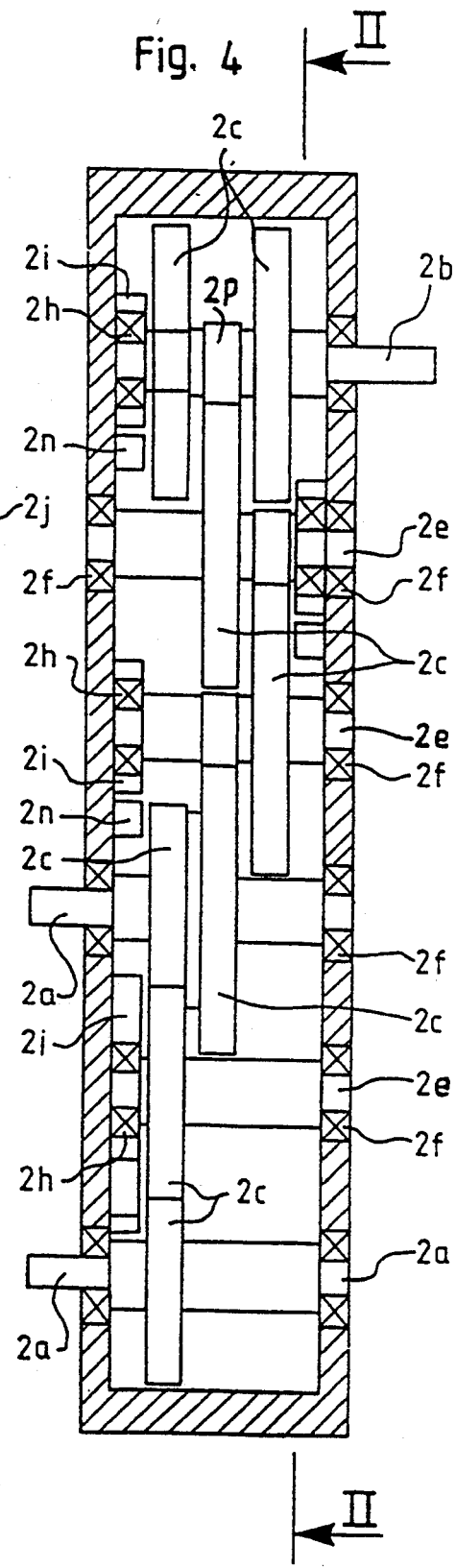

ARRANGEMENT FOR TRANSPORTING WEB-SHAPED MATERIALS TO BE SCANNED OR EXPOSED

This application is a continuation-in-part of application Ser. No. 07/719,822, filed Jun. 24, 1991, now abandoned.

BACKGROUND OF THE INVENTION

The present invention relates to an arrangement for transporting web-shaped materials, particularly phosphor foils and/or X-ray sheet films, which can be stimulated, at a constant transporting speed in an apparatus for scanning and/or exposing these materials.

Arrangements of the above mentioned general type are known in the art. One such known arrangement is disclosed in the U.S. Pat. No. 4,831,461 and includes a transporting roller unit and a drive unit for driving the transporting roller unit and therefore transporting a web-shaped material,. The uniformity of the transport speed required in an apparatus for scanning and/or exposing phosphor foils and/or X-ray sheet films which can be stimulated is achieved in this patent by a regulated drive motor and by various constructional steps in the design of the transporting roller unit. For example, it is achieved by lifting of a feed roller of the transporting roller pair when the front edge of the film is drawn in by the transporting roller pair, by means of a control device which detects the front edge of the film. Also, this is done by resilient feed rollers, a minimum spacing between the rollers of the transporting roller pair, a spring mounted feed roller so that the transporting roller pair can be pressed away by the web-shaped material. For rotational movement of the drive motor is transmitted to a first transporting roller pair directly or through a belt composed of metal or plastic. The second transporting roller pair is connected with the first transporting roller pair by belts or additional rollers and discs, respectively, and rotate synchronously with the first transporting roller pair. Since in this patent the drive motor is connected with the transporting rollers to be driven directly or via a drive belt composed of metal or plastic, the above-mentioned constructual steps or their combination are necessary in order to maintain a low alternation of load when the film edges enter or exit the transporting roller pair. In addition to this step which is costly itself it is necessary to regulate the drive motor in order to achieve a constant transporting speed.

SUMMARY OF THE INVENTION

Accordingly, it is an object of the present invention to provide a transporting arrangement of the above-mentioned general type, which can us a simply transporting roller unit driveable by means of an unregulated drive motor so that a high uniformity of the transporting speed can be maintained.

In keeping with these objects and with others which will become apparent hereinafter, one feature of the present invention resides, briefly stated, in a transporting arrangement having a drive unit, a transporting roller unit, and a friction gear unit therebetween, wherein at least one roller of the transporting roller unit is driveable, one output shaft of the friction gear unit is provided per each driveable roller so that the output shaft and a shaft of the driveable roller are coaxial with one another, the output shaft of the friction gear unit and the roller shaft are connected by an output coupling, an input shaft of the friction gear unit is coaxial relative to a drive motor shaft of a drive motor of the drive unit, and the input shaft is connected with the drive motor shaft by an input coupling, while the drive motor is formed as a stepping motor.

When the transporting arrangement is designed in accordance with the present invention, it eliminates the disadvantages of the prior art and achieves the above mentioned objectives The friction gear unit arranged between the shafts of the driveable rollers of the transporting roller unit for transporting a web-shaped material and the drive shaft of the drive unit includes at least two stages of steel friction wheels which are continuously hardened in an oil quenching bath. Therefore, it is possible to transport the web-shaped material with a very high degree of uniformity of the transporting speed, despite the use of an unregulated stepping motor as the drive motor. In practice, the divergence of line spacings of successive scanned or exposed lines must be less than 1% so that the exposed surface appears uniformly grey. This accuracy requirement can be satisfied with the arrangement in accordance with the present invention without the need for the individual components of the arrangement to possess a high finishing accuracy.

In accordance with another feature of the present invention, the output shafts of the friction gear unit are arranged in fixed bearings which are mounted in flat sides of a housing and lie opposite to one another.

As for remaining friction gears, their shafts are supported at one end in a first fixed bearing arranged in the flat side of the housing. The opposite ends of the shafts of the remaining friction gears are supported in fixed bearings which are arranged at a rocker lever rotatable about an axle which is connected with the housing.

Each rocker lever is provided with a helical spring which can be correspondingly tensioned by an adjusting screw so that a predetermined friction force can be adjusted at the force transmission points of the friction gear units.

The friction gears of the friction gear units in accordance with the present invention run in an oil sump.

The drive motor of the drive unit is connected with the housing by vibration damping connectors. The input coupling is formed as a shaft coupling which is movable via springs.

On the other hand, the output coupling is formed as a diaphragm coupling. This coupling includes an inertia mass, a first diaphragm arranged at one side of the inertia mass facing toward the friction gear unit, and a second diaphragm arranged at the other side of the inertia mass and facing toward the transporting roller unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings. BRIEF DESCRIPTION OF THE DRAWINGS FIG. 1 is a view schematically showing a transporting arrangement for transporting web-shaped materials in accordance with the present invention, including a transporting roller unit, a friction gear unit, and a drive unit;

FIG. 1a is a side view of the transporting arrangement of FIG. 1;

FIG. 2 is a view showing the transporting roller arrangement with two driven rollers in the inventive transporting arrangement;

FIG. 2a is a side view of the transporting roller unit of FIG. 2;

FIG. 4 is a top view of the friction gear unit of the transporting arrangement in accordance with the present invention, with an input shaft and two output shafts;

FIG. 4a is a view showing a section along the line II in FIG. 4.

DESCRIPTION OF THE PREFERRED EMBODIMENTS

Figure 3A:
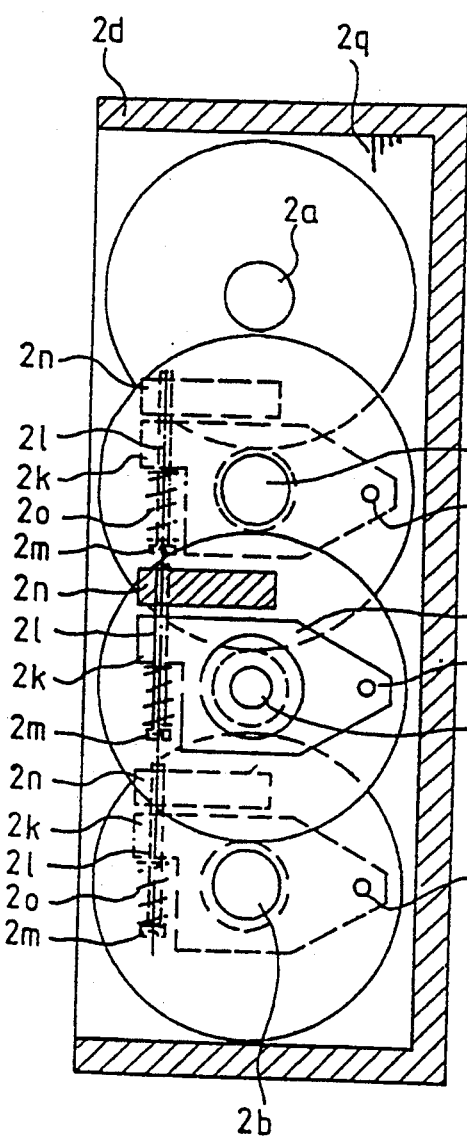
FIG. 3a is a view showing a section taken along the line I in FIG. 3.
Figure 3:
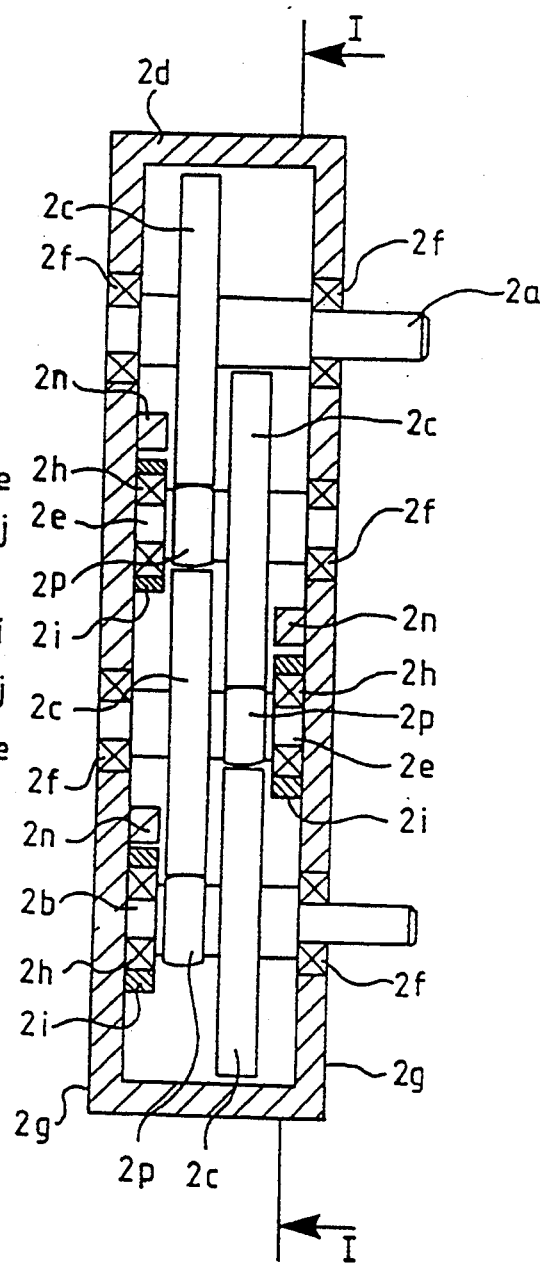
FIG. 3 is a top view of the friction gear unit of the inventive transporting arrangement with an input shaft and an output shaft.

An arrangement for transporting a web-shaped material includes a transporting unit which is identified with reference numeral 1, a friction gear unit which is identified with reference numeral 2 and a drive motor which is identified with reference numeral 3. The transporting unit is formed as a roller unit and includes a driven roller identified as 1a with a shaft identified as 1b, and a feed roller identified as 1c with a shaft identified as 1d. The friction gear unit 2 includes at least one output shaft 2a and input shaft 2b. The friction gear unit 2 has a plurality of friction gears each identified with reference numerals 2c.

Friction drive which is formed as a friction gear unit 2 has a housing 2d. Each of the friction gears 2c is fixedly arranged on a respective shaft 2a, 2b, 2e. The housing 2 has to flat sides which are located opposite to one another and identified as 2g. The output shaft 2a is rotatably supported by two fixed bearings 2f arranged in the flat sides 2g. The input shaft 2b and the shafts of the friction wheels 2c located between the input shaft 2b and the output shaft 2a and identified as 2e are rotatably supported at each end by a fixed bearing 2f which is fixedly arranged in the respective flat side 5g of the housing.

The other end of the friction gear shaft 2e and the input shaft 2b is rotatably supported in a fixed bearing 2h arranged on a rocker lever 2i. The rocker lever 2i is supported so that it is rotatable about an axle 2j which is connected in a fixed manner with the corresponding flat side 2g.

The rocker lever 2i has a projection 2k formed at an end which is opposite to the axle 2j. The projection 2k has a through hole 21 for an adjusting screw 2m. The adjusting screw 2m can be screwed through the hole 21 into a rib 2n of the flat sides 2g of the housing 2. A helical spring 2o is located between the head of the adjusting screw 2m and the projection 2k. The friction shaft 2e, 2b has a ball-shaped area 2p which can be pressed against the friction wheel 2c so as to contact the latter with an adjustable force by means of the adjusting screw 2m and the helical spring 20.

A rotational movement of the input shaft 2b is transmitted to the next friction gear 2c at the place where the cambered area 2p is pressed against the following friction gear 2c. Then it is transmitted to the next friction gear shaft 2e which in turn transmits its rotational movement to the next friction gear 2c and the next friction gear shaft 2e, until the rotational movement is transmitted to the output shaft 2a. The friction gear 2c of the input shaft 2b is not used for transmitting the rotational movement from the input shaft 2b to the following friction gear shaft 2c, but rather as a centrifugal mass.

The friction gears 2c operate in an oil sump 2q which is located in the interior of the closed housing 2d.

The rotational movement is produced by a stepping motor 3. The stepping motor 3 is mounted at the flat side 2g of the housing by four rubber-to-metal connections or vibration dampening connections 39, from which flat side 2g the input shaft 2b projects. The input shaft 2b and also a drive shaft 3b of the stepping motor 3 are arranged coaxially relative to one another. They are connected with one another by shaft coupling 4 which is movable via springs.

The friction gear unit 2 and the drive motor 3 mounted on it are arranged in relation to the transporting roller unit 1 so that the output shaft 2a and the shafts 1b of the driven rollers 1a are in alignment with one another.

The shafts 1b of the driven rollers 1a and the output shafts 2a are connected with one another by a diaphragm coupling 5. The diaphragm coupling 5 includes an inertial mass 5a located between a diaphragm 5b on the side of the transporting roller unit 1, and a diaphragm 5c on the side of the output shaft 2a.

A uniform rotational movement of the output shaft 2a can be transmitted to the shaft 1b of the driven rollers 1a of the transporting roller unit 1 by means of the inventive arrangement, wherein the friction gear unit 2 has no synchronization fluctuations due to pitch and tooth profile errors compared with a toothed gear unit. Compared with the belt gear unit, it has less of a tendency to radial vibrations which occur in belt gear units because of the elasticity of the belts. The uniform rotational movement of the shaft 1b of the driven rollers 1a is a result of the adaptation of the mass moment of inertia of the friction gears 2c (flywheels) and the stiffness against torsion as well as the damping characteristics of the input coupling 4 on the utilized motor. Therefore it is possible that the required synchronous running of the shafts 1b of the driven rollers 1a (the allowable deviation of two successive line spacings from successive lines is less than 1%), can be achieved with a small stepping motor operated in half-step mode and producing relatively high vibrations.

In the arrangement in accordance with the present invention, despite of a stepped movement of the stepping motor, a uniform movement of the transporting roller is provided. This is obtained due to the use of the damper and the friction drive. The damper damps the vibrations which are transmitted from the drive shaft 3b to the input shaft 2b of the friction drive, in particular radial vibrations of the shaft. The damper in accordance with the present invention includes at least one flywheel 2c and the input coupling 4, but not the output coupling 5. The drive has a relatively high ratio. The amplitudes of the remaining radial vibrations of the input shaft are reduced by the high ratio of the drive to the fraction of the ratio and are no longer disturbing on the output shaft.

As described hereinabove., for dampening the vibrations which are transmitted from the stepping motor 3 to the housing 2d, the motor is supported on the housing in a dampening manner, for example, with rubber. The drive is a force-transmitting drive and is not formed as a form-locking (interengaging) drive, since in a force-transmitting drive there is no synchronization fluctuations due to pitch and tooth profile. The friction drive is provided with friction wheels formed so that the friction wheels and their surfaces are composed of hardened steel. It is of course possible instead of the friction gear drive, to provide a friction belt drive.

The input coupling 4 and the output coupling 5 have totally different purposes and therefore they are formed in a different manner.

The input coupling 4 serves on the one hand for connecting the output shaft 3b of the stepping motor with the input shaft 2b of the drive and to compensate the axial offset. On the other hand, it is a component of the damper which converts the non-uniform movement of the stepping motor 3 into a uniform movement of the input shaft. The input coupling dampens vibrations and radial fluctuations which are transmitted from the stepping motor to the input shaft 2b. Thereby the input coupling is very soft. Its stiffness is low, while its dampening properties are high. The damper includes not only the soft input coupling, but also the flywheel with a high inertia moment. For the input coupling, in principle, each rotary-elastic, soft coupling can be used. It can be composed for example of rubber or a soft synthetic plastic material.

The flywheel 2c on the input shaft 2b acts only as inertia mass and not as a force-transmitting friction gear.

The output coupling 5 has only the purpose of connecting the output shaft 2a of the drive with the shaft 1b of the transporting roller 1a. The output coupling compensates position deviations between the output shaft of the drive and the transporting roller and facilitates the mounting and the servicing of the driven transporting roller on the drive. In the shown embodiment the output coupling is formed as a diaphragm coupling, the coupling has an inertia mass and soft and elastic diaphragms.

The coupling dampens the disturbing radial, axial and torsion fluctuations acting on the transporting rollers.

In accordance with a further embodiment of the present invention, the output coupling can be dispensed with and the transporting rollers can be directly connected, for example rigidly with the output shaft 2a. For this purpose the drive is mounted on the base plate in a spring-movable and dampened manner, and the transporting rollers are supported on the base plate. The base plate is shown in FIGS. 1 and 2 as a frame.

The drive motor can be formed as a "VEXTA"-stepping motor, type PH 265-E1.0. It operates with a relatively high high rotary speed of 700 revolutions per minute. It is controlled by a standard stepping motor card and has 200 steps per revolution. The rotary speed of 700 revolutions per minute is converted with a ratio 60:1 to a rotary speed of 11.7 revolutions per minute on the output shaft. This corresponds to 12,000 steps of the stepping motor per revolution of the transporting shaft. With a diameter of the transporting shaft of 82 mm, this corresponds to 46.6 steps of the stepping motor per millimeter of the transporting path of the transporting roller. In the inventive arrangement the friction drive is formed so that the transmission ratio between the steps of the stepping motor and the transporting path of the web-shaped material is at least 20 steps per one millimeter. The high stepping number of the drive motor per millimeter of the transporting path acts, in combination with the damper located between the motor output shaft and the drive input shaft, to provide a highly accurate and approximately uniform movement of the driven transporting roller. The high transmission ratio of the drive provides a great torque on the output shaft. This contributes to the uniformity of the movement, especially when outside disturbances act on the transporting roller, for example when the film to be transported must be moved over a narrow curve radius.

It will be understood that each of the elements described above, or two or more together, may also find a useful application in other types of constructions differing from the types described above.

While the invention has been illustrated and described as embodied in a transporting arrangement for web-shaped materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for driving at least one roller of a roller unit for transporting web-shaped materials, such as X-ray sheet films or stimulatable phosphorous foils with substantially constant speed in a device for exposing or scanning these materials, the arrangement comprising a stepping motor having a motor output shaft; a friction drive having a drive input shaft connected with said motor output shaft of said stepping motor and also having a drive output shaft connected with the at least one roller; means for vibration damping provided between said motor output shaft and said drive input shaft, said friction drive being formed with a transmission ratio such that a ratio between steps of said stepping motor and a transporting path of the web-shaped material is at least 20 steps per one millimeter, so that said ratio between steps of said stepping motor and a transporting path of the web-shaped material in combination with said friction drive and said vibration damping means arranged between said stepping motor and said friction drive provide conversion of a stepped motion of the stepping motor into a continuous motion of said roller to provide an accurate and approximately uniform movement of said roller.

2. An arrangement as defined in claim 1, wherein said friction drive is formed as a friction gear unit.

3. An arrangement as defined in claim 1, wherein said means for vibration damping includes a coupling and said friction drive includes a flywheel.

4. An arrangement as defined in claim 1, wherein said friction drive has at least three force-transmitting points located between said drive input shaft and said drive output shaft.

5. An arrangement as defined in claim 4, wherein said force-transmitting points are formed by friction gears, said friction gears and their outer surfaces are composed of hardened steel.

6. An arrangement as defined in claim 4, wherein said friction drive has a plurality of drive shafts including said drive input shaft and said drive output shaft, a plurality of fixed bearings, and a housing, said force-transmitting points being formed as friction gears, each of said friction gears being arranged on a respective one of said drive shafts, said drive output shaft being rotatably supported at its ends in respective ones of said fixed bearings arranged in respective opposite flat sides of said housing one end of each of the remaining of said drive shafts being rotatably supported by one of said bearings which is arranged in one flat side of said housing while another end of each of the remaining ones of said friction gears is rotatably supported in another of said fixed bearings which is not arranged in a flat side of said housing.

7. An arrangement as defined in claim 6 and further comprising rocking levers arranged so that each of said another fixed bearings is supported on a respective one of said rocking levers, said rocking levers being rotatably supported on an axle which is fixedly connected with said housing, each of said rocking lever being provided with a helical spring which is tensioned by an adjusting screw, said force-transmitting points being adjustable to a definite friction force, said friction gears running in an oil sump.

8. An arrangement as defined in claim 1; and further comprising means for mounting said stepping motor in a vibration damping manner.

9. An arrangement as defined in claim 1; and further comprising a coupling located between said drive output shaft and the at lesat one roller, said output coupling including a first diaphragm facing said drive output shaft, a second diaphragm facing the at least one roller, and an inertia mass located between said diaphragms.

10. An arrangement as defined in claim 1; and further comprising an output coupling arranged between said drive output shaft and the roller.

11. An arrangement as defined in claim 1, wherein said stepping motor is a motor which provides 100–1,000 steps per revolution.

* * * * *